(12) United States Patent
Wu (10) Patent No.: US 12,118,498 B2
(45) Date of Patent: Oct. 15, 2024

(54) SYSTEM FOR REALIZING AUTOMATED TRANSPORT OF GOODS AND RELATED APPARATUS

(71) Applicant: BEIJING TUSEN ZHITU TECHNOLOGY CO., LTD., Beijing (CN)

(72) Inventor: Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 737 days.

(21) Appl. No.: 17/147,306

(22) Filed: Jan. 12, 2021

(65) Prior Publication Data

US 2021/0132610 A1    May 6, 2021

Related U.S. Application Data

(63) Continuation of application No. PCT/CN2019/077056, filed on Mar. 5, 2019.

(51) Int. Cl.
    *G06Q 10/08*    (2024.01)
(52) U.S. Cl.
    CPC ......... *G06Q 10/08* (2013.01); *B60W 2300/12* (2013.01); *B60W 2420/403* (2013.01); *B60W 2420/54* (2013.01)
(58) Field of Classification Search
    CPC . G05D 1/021; G05D 2201/0205; G06Q 50/28
    See application file for complete search history.

(56) References Cited

U.S. PATENT DOCUMENTS

| 4,634,332 | A | * | 1/1987 | Kamide | ............... G05D 1/0265 700/218 |
| 8,596,951 | B1 | | 12/2013 | Ward et al. | |

(Continued)

FOREIGN PATENT DOCUMENTS

| CN | 1560757 A | 1/2005 |
| CN | 103136955 A * | 6/2013 |

(Continued)

OTHER PUBLICATIONS

English Translation of TW-201708996-A (Year: 2015).*

(Continued)

*Primary Examiner* — David P. Merlino
*Assistant Examiner* — Matthew Ho
(74) *Attorney, Agent, or Firm* — Perkins Coie LLP (57) ABSTRACT

A system for automated goods transportation is provided. The system includes a management system, a vehicle scheduling system, a loading/unloading control device, and autonomous driving control devices provided on respective autonomous vehicles. The management system is configured to manage goods information, generate a transportation plan based on the goods information, and transmit the transportation plan to the vehicle scheduling system. The vehicle scheduling system is configured to generate transportation tasks based on the transportation plan and the transportation statuses of the respective autonomous vehicles, and transmit each of the transportation tasks to the autonomous driving control device of the matching autonomous vehicle. The autonomous driving control device is configured to control the autonomous vehicle to complete transportation in accordance with the transportation task. The loading/unloading control device is configured to control a loading/unloading device to automatically load goods onto or unload goods from the autonomous vehicles.

13 Claims, 3 Drawing Sheets

(56) References Cited

U.S. PATENT DOCUMENTS

| | | | |
|---|---|---|---|
| 2007/0140821 A1* | 6/2007 | Garon | B25J 9/0084 |
| | | | 414/730 |
| 2017/0270466 A1 | 9/2017 | Kao et al. | |
| 2017/0323253 A1* | 11/2017 | Enssle | B25J 9/1694 |
| 2018/0164818 A1* | 6/2018 | Wilkinson | G05D 1/02 |
| 2018/0194575 A1* | 7/2018 | Anderson | G06Q 10/08 |
| 2018/0197137 A1* | 7/2018 | High | B64C 39/024 |
| 2019/0129593 A1* | 5/2019 | Chein | G06Q 30/0239 |
| 2020/0143502 A1* | 5/2020 | Yan | G06Q 10/0631 |
| 2021/0155409 A1* | 5/2021 | Haid | B65G 65/00 |

FOREIGN PATENT DOCUMENTS

| | | | | |
|---|---|---|---|---|
| CN | 105383843 A | 3/2016 | | |
| CN | 106203915 A | 12/2016 | | |
| CN | 106395219 A | 2/2017 | | |
| CN | 107329480 A | 11/2017 | | |
| CN | 107390689 A | 11/2017 | | |
| CN | 107403206 A | 11/2017 | | |
| CN | 107628404 A | 1/2018 | | |
| CN | 207051717 U | 2/2018 | | |
| CN | 107783541 A | 3/2018 | | |
| CN | 107807633 A | 3/2018 | | |
| CN | 207115198 U | 3/2018 | | |
| CN | 207264194 U | 4/2018 | | |
| CN | 109669464 A | 4/2019 | | |
| JP | H09142609 A | 6/1997 | | |
| TW | 201708996 A | * | 3/2017 | G01C 21/34 |

OTHER PUBLICATIONS

English translation of CN-103136955-A (Year: 2013).*
Chinese Patent Office, 1st Office Action for Appl. No. 201910058356.3, mailed Jul. 21, 2023, 36 pages with English translation.
No Author. International Application No. PCT/CN2019/077056 International Search Report and Written Opinion, mailed May 29, 2019, pp. 1-16.
European Patent Office, Extended European Search Report for EP 19834205.7, Mailing Date: Mar. 9, 2022, 8 pages.
European Patent Office, Examination Report for Application No. 19834205.7 dated Sep. 18, 2023, 5 pages.
Australian Patent Office, Examination Report No. 1 for AU Appl. No. 2019302313, mailed on Jan. 22, 2024, 5 pages.
Chinese Patent Office, 2nd Office Action for Appl. No. 201910058356.3, mailed Mar. 1, 2024, 37 pages with English translation.
Australian Patent Office, Examination Report No. 2 for AU Appl. No. 2019302313, mailed on May 8, 2024, 5 pages.
Chinese Patent Office, Rejection Decision for CN Appl. No. 201910058356.3, mailed on Jun. 19, 2024, 26 pages with English translation.

* cited by examiner

SYSTEM FOR REALIZING AUTOMATED TRANSPORT OF GOODS AND RELATED APPARATUS

The present disclosure is a continuation of International Application No. PCT/CN2019/077056, with title "SYSTEM FOR REALIZING AUTOMATED TRANSPORT OF GOODS AND RELATED APPARATUS", and filed on Mar. 5, 2019, which claims priority to Chinese Patent Application No. 201810764556.6, titled "SYSTEM FOR REALIZING AUTOMATED TRANSPORT OF GOODS AND RELATED APPARATUS", filed on Jul. 12, 2018, both of which are incorporated herein by reference in their entirety.

TECHNICAL FIELD

The present disclosure relates to autonomous driving technology, and more particularly, to a system for automated goods transportations, a management system, a vehicle scheduling system, an autonomous driving control device, an autonomous vehicle, and a loading/unloading control device.

BACKGROUND

Currently, in some large ports, containers are carried by trucks in a port area from ships to a yard or from the yard to the ships. The trucks in the port area are driven by truck drivers, and truck drivers cannot work continuously 24 hours a day. Therefore, at least 2-3 truck drivers are needed for a truck. However, due to the large number of trucks in the port area, a large number of truck drivers are needed, resulting in a high cost. Furthermore, there may be many vehicles and containers in the port area, and the working environment of truck drivers is dangerous. Therefore, how to achieve a fully automated goods transportation in the port area to reduce the cost has become a technical problem to be solved currently.

SUMMARY

In view of the above problem, the present disclosure provides a system for automated goods transportation and related devices, capable of achieving fully automated goods transportation within a particular area (e.g., a coastal port area, a highway port area, a mining area, a large warehouse, a goods distribution center, a campus, or the like).

In a first aspect, a system for automated goods transportation is provided according to an embodiment of the present disclosure. The system includes a management system, a vehicle scheduling system, a loading/unloading control device, and autonomous driving control devices provided on respective autonomous vehicles. The management system is configured to manage goods information, generate a transportation plan based on the goods information, and transmit the transportation plan to the vehicle scheduling system. The vehicle scheduling system is configured to generate, upon receiving the transportation plan, transportation tasks based on the transportation plan and the transportation statuses of the respective autonomous vehicles, and transmit each of the transportation tasks to the autonomous driving control device of the matching autonomous vehicle. The autonomous driving control device on each of the autonomous vehicles is configured to control, upon receiving the transportation task, the autonomous vehicle to complete transportation in accordance with the transportation task. The loading/unloading control device is configured to control a loading/unloading device to automatically load goods onto or unload goods from the autonomous vehicles.

In a second aspect, a management system is provided according to an embodiment of the present disclosure. The management system includes: a first communication unit configured to transmit and receive information; a goods management unit configured to manage goods information; and a transportation plan generating unit configured to generate a transportation plan based on the goods information, and transmit the transportation plan to a vehicle scheduling system via the first communication unit.

In a third aspect, a vehicle scheduling system is provided according to an embodiment of the present disclosure. The vehicle scheduling system comprises: a second communication unit configured to transmit and receive information; a vehicle management unit configured to manage transportation statuses of respective autonomous vehicles; and a scheduling unit configured to generate, upon receiving a transportation plan via the second communication unit, transportation tasks based on the transportation plan and the transportation statuses of the respective autonomous vehicles, and transmit each of the transportation tasks to an autonomous driving control device for the matching autonomous vehicle via the second communication unit.

In a fourth aspect, an autonomous driving control device is provided according to an embodiment of the present disclosure. The autonomous driving control device includes: a third communication unit configured to transmit and receive information; and a first control unit configured to control, upon receiving a transportation task via the third communication unit, an autonomous vehicle to complete transportation in accordance with the transportation task.

In a fifth aspect, a loading/unloading control device is provided according to an embodiment of the present disclosure. The loading/unloading control device includes: a fourth communication unit configured to transmit and receive information; and a second control unit configured to control a loading/unloading device to automatically load goods onto or unload goods from an autonomous vehicle.

In a sixth aspect, an autonomous vehicle is provided according to an embodiment of the present disclosure. The autonomous vehicle includes the autonomous driving control device according to the above fourth aspect.

With the technical solutions according to the embodiments of the present disclosure, communication control among the management system, the vehicle scheduling system, the autonomous driving control devices on the autonomous vehicles, and the loading/unloading control device is performed to allow the autonomous vehicles to transport goods automatically in a particular area, thereby achieving fully automated goods transportation within the particular area (e.g., a coastal port area, a mining area, a highway port area, a warehouse, a goods distribution center, a campus, a logistics center, or the like). It does not need to have truck drivers for each truck, so as to reduce the cost.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from the figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The solutions according to the present disclosure can be applied in some particular areas such as coastal port areas, highway port areas, mining areas, goods distribution centers, warehouses, campuses, logistics centers, or the like. The present disclosure is not limited to any specific application scenario of the solutions according to the present disclosure. The following embodiments will be described with reference to an application scenario in a port area mainly, and the principles of the present disclosure can be equally applied to other application scenarios.

In the embodiments of the present disclosure, a loading/unloading device may be a bridge crane (i.e., a shore crane), a rail crane, a tire crane, a tower crane, a reach stacker, an overhead crane, a mobile crane, a robot, a forklift, etc. The present disclosure is not limited to any specific structure of the loading/unloading device.

In the embodiments of the present disclosure, an autonomous vehicle may refer to any vehicle having autonomous driving functions, including e.g., trucks, vans, Automated Guided Vehicles (AGVs), cranes, forklifts, tire cranes, reach stackers, etc. The present disclosure is not limited to any specific type of autonomous vehicle.

Embodiment 1

Figure 1:
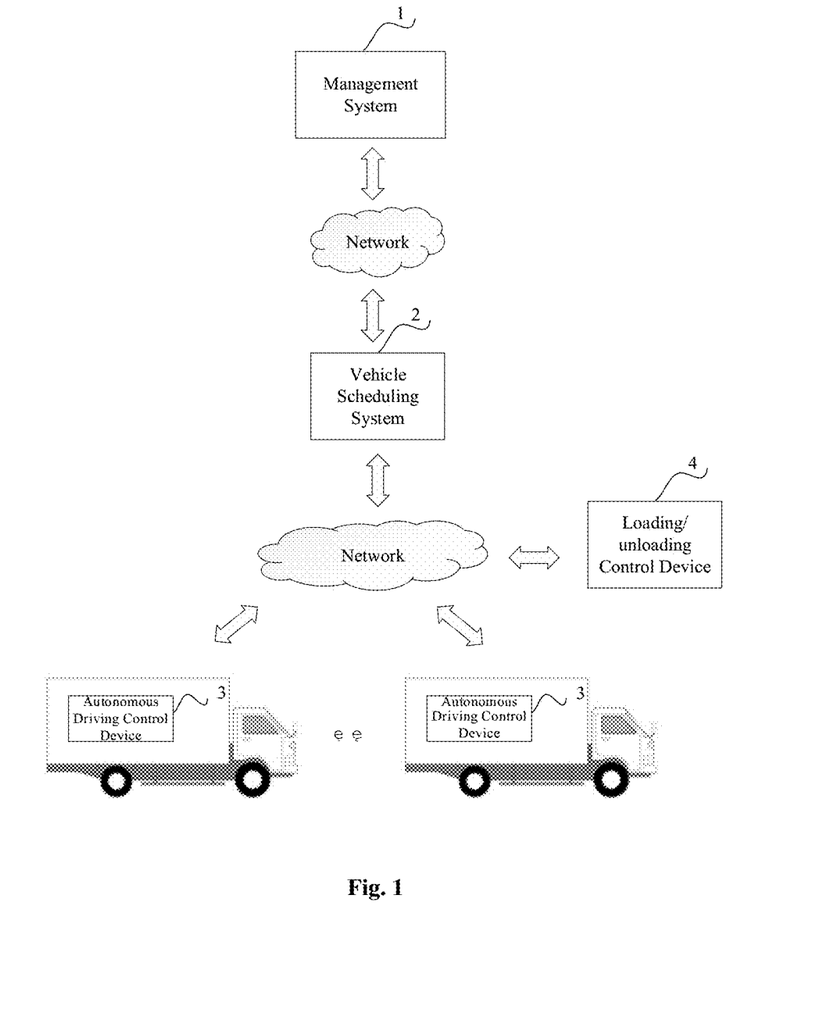
FIG. 1 is a schematic diagram showing a structure of a system for automated loading/unloading according to an embodiment of the present disclosure.

Referring to FIG. 1, which is a schematic diagram showing a structure of a system for automated goods transportation according to an embodiment of the present disclosure, the system includes a management system 1, a vehicle scheduling system 2, autonomous driving control devices 3 provided on respective autonomous vehicles, and a loading/unloading control device 4.

The management system 1 is configured to manage goods information, generate a transportation plan based on the goods information, and transmit the transportation plan to the vehicle scheduling system 2.

The vehicle scheduling system 2 is configured to generate, upon receiving the transportation plan, transportation tasks based on the transportation plan and the transportation statuses of the respective autonomous vehicles, and transmit each of the transportation tasks to the autonomous driving control device 3 of the matching autonomous vehicle The autonomous driving control device 3 on each of the autonomous vehicles is configured to control, upon receiving the transportation task, the autonomous vehicle to complete transportation in accordance with the transportation task.

The loading/unloading control device 4 is configured to control a loading/unloading device to automatically load goods onto or unload goods from the autonomous vehicles.

In an embodiment of the present disclosure, the autonomous driving control device 3 may be provided on a vehicle-mounted Digital Signal Processor (DSP), Field-Programmable Gate Array (FPGA) controller, industrial computer, vehicle computer, Electronic Control Unit (ECU), or Vehicle Control Unit (VCU).

In an embodiment of the present disclosure, the loading/unloading control device 4 may be a computer server, such as a DSP, an FPGA controller, an industrial computer, a tablet computer, or a PC, etc., provided on the loading/unloading device. An operator can control the loading/unloading device to perform loading/unloading by operating the computer server. Of course, the loading/unloading control device 4 can alternatively be a remote control device capable of wireless communication, and an operator can remotely control the loading/unloading device using the remote control device. The present disclosure is not limited to any of these examples.

In an embodiment of the present disclosure, the vehicle scheduling system 2 may be a computer server, such as a DSP, an FPGA controller, an industrial computer, a tablet computer, or a PC, etc. The present disclosure is not limited to any of these examples.

In an embodiment of the present disclosure, the management system 1 may be a computer server, such as a DSP, an FPGA controller, an industrial computer, a tablet computer, or a PC, etc. The present disclosure is not limited to any of these examples.

The goods information managed by the management system 1 may include basic information of all goods contained in a particular area (e.g., a coastal port area, a highway port area, a logistics campus, a logistics center, a goods distribution center, a warehouse, a mining area, or the like), including for example: goods type, goods ID number, goods owner, goods source, goods storage time, current storage position of goods, goods transportation destination, deadline for delivery of goods to the transportation destination, etc. The management system 1 can generate the transportation plan based on the goods information in the following, non-limiting scheme. For goods to be transported, shipping-from-storage time can be determined based on the deadline for delivery of the goods to be transported to the transportation destination, and the transportation plan containing transportation information can be generated for the goods to be transported. The transportation information may include, but not limited to, any one or more of the following information: goods type, goods ID number, goods shipping-from-storage time, goods transportation start point and goods transportation end point.

The goods transportation start point may be a storage position of the goods to be transported. Alternatively, the goods transportation start point may be a loading position corresponding to the storage position of the goods to be transported. For example, a port area may contain a large number of storage yards, each corresponding to one or more loading positions. A loading position for the storage yard where the storage position of the goods to be transported is located can be determined as the goods transportation start point. In another example, a logistics campus may contain a large number of warehouses, and an entrance position of each warehouse can be a loading position of the warehouse. The entrance position of the warehouse where the storage position of the goods to be transported is located can be determined as the goods transportation start point. The present disclosure is not limited to any of these examples. The goods transportation end point may be the transportation destination of the goods to be transported.

In some embodiments, in order to update the goods information in time such that the management system 1 can generate the transportation plan accurately, in an embodiment of the present disclosure, the autonomous driving control device 3 transmits a transportation task completion message to the vehicle scheduling system 2 when the transportation task is completed. The vehicle scheduling system 2 can transmit the transportation task completion message to the management system 1. Upon receiving the transportation task completion message, the management system 1 can update the goods information based on the completed transportation task.

In an embodiment of the present disclosure, the identity information and vehicle type (for example, container truck, van, AGV, forklift, crane, etc.) of each autonomous vehicle may be stored in the vehicle scheduling system 2 in advance. Each autonomous vehicle can periodically synchronize the transportation status of the autonomous vehicle (the transportation status may include position information and vehicle status information (including status information such as busy status or idle status) of the autonomous vehicle) to the vehicle scheduling system 2. Upon receiving the transportation plan, the vehicle scheduling system 2 can generate the transportation tasks based on the transportation plan and the transportation statuses of the respective autonomous vehicles, and transmit each of the transportation tasks to the autonomous driving control device of the matching autonomous vehicle in the following, non-limiting scheme. For each transportation plan, a matching condition can be determined based on the transportation plan. From the managed autonomous vehicles, one autonomous vehicle that satisfies the matching condition can be selected as the autonomous vehicle matching the transportation plan. The transportation task can be generated based on the transportation plan and the matching autonomous vehicle. The transportation task may include, but not limited to, any one or more of the following information: goods type, goods ID number, goods shipping-from-storage time, goods transportation start point, goods transportation end point, and ID information of the matching autonomous vehicle. The matching condition may be, for example, the type of vehicle being capable of transporting the goods in the transportation plan, and the vehicle status of the autonomous vehicle being an idle status. The one autonomous vehicle that satisfies the matching condition can be selected from the managed autonomous vehicles as the autonomous vehicle matching the transportation plan as follows. A first set of autonomous vehicles each having a vehicle type capable of transporting the type of goods in the transportation plan is selected from the autonomous vehicles. A second set of autonomous vehicles each having a vehicle status of idle is selected from the first set of autonomous vehicles. If the second set of autonomous vehicles only contains one autonomous vehicle, the one autonomous vehicle can be directly determined as the autonomous vehicle matching the transportation plan. If the second set of autonomous vehicles contains more than one autonomous vehicle, an autonomous vehicle having its current position closest to the goods transportation start point in the transportation plan can be selected from the second set of autonomous vehicles, as the autonomous vehicle matching the transportation plan. If the second set of autonomous vehicles is null, an autonomous vehicle having its goods transportation end point closest to the goods transportation start point in the transportation plan can be selected from the first set of autonomous vehicles, as the autonomous vehicle matching the transportation plan.

In some embodiments, in order to update the transportation statuses of the respective autonomous vehicles in time such that the vehicle scheduling system 2 can generate the transportation tasks to be distributed accurately, in an embodiment of the present disclosure, the autonomous driving control device 3 can transmit a transportation task completion message to the vehicle scheduling system 2 when the transportation task is completed, and/or the autonomous vehicle can report its position information to the vehicle scheduling system 2 periodically. The vehicle scheduling system 2 can update the transportation status of the corresponding autonomous vehicle based on the completed transportation task and/or the position information.

In an embodiment of the present disclosure, a "loading/unloading position" may refer to a position or area for both unloading and loading. For loading at the "loading/unloading position", the "loading/unloading position" may be referred to as a "loading position", and for unloading at the "loading/unloading position", the "loading/unloading position" may be referred to as an "unloading position".

In some embodiments, when the transportation task indicates moving to a goods transportation start point for loading goods, the transportation task may contain a loading position (which may be the goods transportation start point), and the autonomous driving control device 3 can control the autonomous vehicle to complete the transportation in accordance with the transportation task by: controlling the autonomous vehicle to move from a current position to the loading position; and upon determining that the loading is completed, controlling the autonomous vehicle to leave the loading position. When the transportation task indicates carrying goods to a goods transportation end point for unloading, the transportation task may contain an unloading position (which may be the above goods transportation end point), and the autonomous driving control device 3 can control the autonomous vehicle to complete the transportation in accordance with the transportation task by: controlling the autonomous vehicle to move from a current position to the unloading position; and upon determining that the unloading is completed, controlling the autonomous vehicle to leave the unloading position.

In some embodiments, when the transportation task indicates moving to a goods transportation start point for loading goods and carrying the goods to a goods transportation end point for unloading, the transportation task may contain a loading position (which may be the above goods transportation start point) and an unloading position (which may be the above goods transportation end point), and the autonomous driving control device 3 can control the autonomous vehicle to complete the transportation in accordance with the transportation task by: controlling the autonomous vehicle to move from a current position to the loading position; controlling, upon determining that the loading is completed, the autonomous vehicle to move from the loading position to the unloading position; and controlling, upon determining that the unloading is completed, the autonomous vehicle to leave the unloading position.

In an embodiment of the present disclosure, the autonomous driving control device 3 can control the autonomous vehicle to move from the current position to the loading position in the following, non-limiting scheme. The autonomous driving control device 3 can determine a first driving route from the current position as a start point to the loading position as an end point, and control the autonomous vehicle to move from the current position to the loading position along the first driving route.

In an embodiment of the present disclosure, the autonomous driving control device 3 can determine the first driving route by planning the first driving route based on locally stored map data. Alternatively, the vehicle scheduling system 2 can plan the first driving route based on locally stored map data and include the first driving route in the transportation task, such that the autonomous driving control device 3 can obtain the first driving route from the transportation task. Therefore, in an embodiment of the present disclosure, the autonomous driving control device 3 can determine the driving route from the current position as the start point to the loading position as the end point in any of the following, non-limiting schemes (Schemes A1~A3).

Scheme A1: The autonomous driving control device 3 can plan the first driving route from the current position as the start point to the loading position as the end point based on pre-stored map data.

In Scheme A1, the autonomous driving control device 3 can plan the driving route using its own navigation software, or the autonomous driving control device 3 can plan the first driving route using third-party map software.

Scheme A2: The autonomous driving control device 3 can obtain from the transportation task the first driving route from the current position to the loading position.

In Scheme A2, the first driving route is composed of path points constituting the first driving route, and the autonomous driving control device 3 can sequentially display the path points in the transportation task on a local map, and use the first driving route displayed on the map as a navigation route to control the vehicle to move from the current position to the loading position.

Of course, when the current position of the autonomous vehicle is outside the particular area (such as coastal port area, highway port area, mining area, campus, warehouse, logistics center, goods distribution center, etc.) where the loading position is located, in addition to the above Scheme A1 and Scheme A2, the following Scheme A3 can be used.

Scheme A3: The transportation task can contain an in-area driving route from an entrance of the particular area to the loading position. The autonomous driving control device 3 can plan an out-of-area driving route from the current position to the entrance of the particular area based on stored map data, and control the autonomous vehicle to move from the current position to the entrance of the particular area in accordance with the out-of-area driving route, and to move from the entrance of the particular area to the loading position in accordance with the in-area driving route in the transportation task.

In the embodiment of the present disclosure, the autonomous driving control device 3 can control the autonomous vehicle to move from the loading position to the unloading position in the following, non-limiting scheme. The autonomous driving control device 3 can determine a second driving route from the loading position as a start point to the unloading position as an end point, and control the autonomous vehicle to move from the loading position to the unloading position along the second driving route. The autonomous driving control device 3 can determine the second driving route from the loading position as the start point to the unloading position as the end point according to similar principles to the above Schemes A1~A2, and details thereof will be omitted here.

In some embodiments, the autonomous driving control device 3 can determine that the loading is completed in any of the following, non-limiting schemes (Schemes B1~B5).

Scheme B1: It can be determined that the loading is completed when an instruction indicating completion of the loading onto the autonomous vehicle is received from the loading/unloading control device 4.

In Scheme B1, correspondingly, when the loading/unloading control device 4 determines that the loading/unloading device has completed the loading onto the autonomous vehicle, it can transmit an instruction indicating completion of the loading onto the autonomous vehicle to the autonomous driving control device 3 of the autonomous vehicle. In Scheme B1, the autonomous driving control device 3 and the loading/unloading control device 4 can communicate with each other.

Scheme B2: It can be determined that the loading is completed when an instruction indicating completion of the loading onto the autonomous vehicle is received from the vehicle scheduling system 2.

In Scheme B2, correspondingly, when the vehicle scheduling system 2 determines that the loading/unloading device has completed the loading onto the autonomous vehicle, it can transmit an instruction indicating completion of the loading onto the autonomous vehicle to the autonomous driving control device 3 of the autonomous vehicle. The vehicle scheduling system 2 can determine that the loading/unloading device has completed the loading onto the autonomous vehicle in the following, non-limiting scheme. The vehicle scheduling system 2 can receive from the loading/unloading control device 4 an instruction indicating completion of the loading onto the autonomous vehicle, so as to determine that the loading onto the autonomous vehicle is completed.

Scheme B3: It can be determined that the loading is completed when determining that a gravity value outputted from a gravity sensor mounted on the autonomous vehicle is greater than or equal to a predetermined gravity threshold and the gravity value has not changed for a predetermined time period.

In Scheme B3, a gravity sensor may be provided on a platform of the autonomous vehicle, and it can be determined whether the loading is completed by monitoring the change of the gravity value outputted from the gravity sensor.

Scheme B4: It can be determined that the loading is completed when a notification message indicating completion of the loading onto the autonomous vehicle is obtained by identifying, using a predetermined image identification algorithm, content in an image of an electronic screen located near the loading position as captured by a vehicle mounted camera provided on the autonomous vehicle.

In Scheme B4, an electronic screen can be provided near each loading position. When the loading onto the autonomous vehicle stopping at the loading position is completed, a notification message indicating completion of the loading onto the autonomous vehicle can be displayed on the electronic screen. For example, information such as "License Plate Number *****, Loading Completed" or "Loading Completed" can be displayed on the electronic screen.

Scheme B5: It can be determined that the loading is completed when a notification message indicating completion of the loading onto the autonomous vehicle as broadcasted by a voice broadcaster is identified using a predetermined voice model.

In Scheme B5, a voice broadcaster can be provided near the loading position. When the loading onto the autonomous vehicle stopping at the loading position is completed, the voice broadcaster can broadcast a notification message indicating completion of the loading onto the autonomous vehicle. For example, the broadcasted voice information may be "License Plate Number *****, Loading Completed" or "Loading Completed".

In some embodiments, the autonomous driving control device 3 can determine that the unloading is completed in any of the following, non-limiting schemes (Schemes C1~C5).

Scheme C1: It can be determined that the unloading is completed when an instruction indicating completion of the unloading from the autonomous vehicle is received from the loading/unloading control device 4.

In Scheme C1, correspondingly, when the loading/unloading control device 4 determines that the loading/unloading device has completed the unloading from the autonomous vehicle, it can transmit an instruction indicating completion of the unloading from the autonomous vehicle to the autonomous driving control device 3 of the autonomous vehicle.

Scheme C2: It can be determined that the unloading is completed when an instruction indicating completion of the unloading from the autonomous vehicle is received from the vehicle scheduling system 2.

In Scheme C2, correspondingly, when the vehicle scheduling system 2 determines that the loading/unloading device has completed the unloading from the autonomous vehicle, it can transmit an instruction indicating completion of the unloading from the autonomous vehicle to the autonomous driving control device 3 of the autonomous vehicle. The vehicle scheduling system 2 can determine that the loading/unloading device has completed the unloading from the autonomous vehicle in the following, non-limiting scheme. The vehicle scheduling system 2 can receive from the loading/unloading control device 4 an instruction indicating completion of the unloading from the autonomous vehicle to determine that the unloading from the autonomous vehicle is completed.

Scheme C3: It can be determined that the unloading is completed when determining that a gravity value outputted from a gravity sensor mounted on the autonomous vehicle is smaller than or equal to a predetermined gravity threshold and the gravity value has not changed for a predetermined time period.

In Scheme C3, a gravity sensor may be provided on a platform of the autonomous vehicle, and it can be determined whether the unloading is completed by monitoring the change of the gravity value outputted from the gravity sensor.

Scheme C4: It can be determined that the unloading is completed when a notification message indicating completion of the unloading from the autonomous vehicle is obtained by identifying, using a predetermined image identification algorithm, content in an image of an electronic screen located near the unloading position as captured by a vehicle mounted camera provided on the autonomous vehicle.

In Scheme C4, an electronic screen can be provided near each unloading position. When the unloading from the autonomous vehicle stopping at the unloading position is completed, a notification message indicating completion of the unloading from the autonomous vehicle can be displayed on the electronic screen. For example, information such as "License Plate Number *****, Unloading Completed" or "Unloading Completed" can be displayed on the electronic screen.

Scheme C5: It can be determined that the unloading is completed when a notification message indicating completion of the unloading from the autonomous vehicle as broadcasted by a voice broadcaster is identified using a predetermined voice model.

In Scheme C5, a voice broadcaster can be provided near the unloading position. When the unloading from the autonomous vehicle stopping at the unloading position is completed, the voice broadcaster can broadcast a notification message indicating completion of the unloading from the autonomous vehicle. For example, the broadcasted voice information may be "License Plate Number *****, Unloading Completed" or "Unloading Completed".

In some embodiments of the present disclosure, each loading/unloading device corresponds to at least one loading/unloading position, and the autonomous vehicle moves to the loading/unloading position corresponding to the loading/unloading device to wait for the loading/unloading device to load/unload goods. Accordingly, the loading/unloading device loads goods onto or unloads goods from the autonomous vehicle stopping at the loading/unloading position corresponding to the loading/unloading device. The loading/unloading control device 4 can control the loading/unloading device to automatically load goods onto or unload goods from the autonomous vehicle in any of the following, non-limiting schemes (Schemes D1~D3).

Scheme D1: the loading/unloading control device 4 can receive a loading/unloading instruction from the autonomous driving control device 3 of the autonomous vehicle stopping at the loading/unloading position corresponding to the loading/unloading device, and control the loading/unloading device to load goods onto or unload goods from the autonomous vehicle in accordance with the loading/unloading instruction.

In Scheme D1, correspondingly, when the autonomous vehicle stops at the loading/unloading position corresponding to the loading/unloading device, the autonomous driving control device 3 can transmit a loading/unloading instruction to the loading/unloading control device corresponding to the loading/unloading device. For example, when the autonomous vehicle arrives at a loading position in the transportation task, a loading instruction can be transmitted to the loading/unloading control device 4. When the autonomous vehicle arrives at an unloading position in the transportation task, an unloading instruction can be transmitted to the loading/unloading control device 4.

Scheme D2: The loading/unloading control device 4 can receive from the vehicle scheduling system 2 a loading/unloading instruction to load goods onto or unload goods from the autonomous vehicle stopping at the loading/unloading position corresponding to the loading/unloading device, and control the loading/unloading device to load goods onto or unload goods from the autonomous vehicle in accordance with the loading/unloading instruction.

In Scheme D2, correspondingly, when the vehicle scheduling system 2 determines from position information transmitted from the autonomous vehicle that the autonomous vehicle has arrived at the loading position/unloading position in the transportation task, it can transmit a corresponding loading/unloading instruction to the loading/unloading control device 4. Alternatively, when the vehicle scheduling system 2 receives a ready-for-loading message or a ready-for-unloading message from the autonomous driving control device 3, it can transmit a corresponding loading/unloading instruction to the loading/unloading control device 4.

Scheme D3: The loading/unloading control device can obtain a vehicle ID number of the autonomous vehicle stopping at the loading/unloading position corresponding to the loading/unloading device, determine a loading/unloading instruction corresponding to the autonomous vehicle from a predetermined correspondence between vehicle ID numbers and loading/unloading instructions, and control the loading/unloading device to load goods onto or unload goods from the autonomous vehicle in accordance with the loading/unloading instruction.

In Scheme D3, the correspondence between vehicle ID numbers and loading/unloading instructions may be stored in the loading/unloading control device 4 in advance.

In Scheme D3, the loading/unloading control device can obtain the vehicle ID number of the autonomous vehicle stopping at the loading/unloading position corresponding to the loading/unloading device in any of the following, non-limiting schemes (Schemes E1~E2).

Scheme E1: A picture on the autonomous vehicle can be captured using a camera provided on the loading/unloading device, and the vehicle ID number can be identified from the picture using an image identification technology. The picture contains the vehicle ID number of the autonomous vehicle.

In Scheme E1, the picture may be a picture containing the vehicle ID number in a text form, or the picture may be a two-dimensional code or a barcode containing the vehicle ID number.

Scheme E2: an electronic tag provided on the autonomous vehicle can be read using an inductive reader provided on the loading/unloading device to obtain the vehicle ID number of the autonomous vehicle. The electronic tag contains the vehicle ID number of the autonomous vehicle.

The vehicle ID number may be information by which the autonomous vehicle can be uniquely identified. For example, it may be a license plate number of the autonomous vehicle, or it may be a serial number preset for the autonomous vehicle.

In some embodiments of the present disclosure, the loading/unloading control device 4 can control the loading/unloading device to load goods onto or unload goods from the autonomous vehicle in accordance with the loading/unloading instruction in the following, non-limiting scheme.

When the loading/unloading instruction is a loading instruction, a goods ID number and a storage position of the goods to be loaded corresponding to the autonomous vehicle can be determined, and the loading/unloading device can be controlled to obtain the goods to be loaded corresponding to the goods ID number from the storage position and to load the goods to be loaded onto the autonomous vehicle.

When the loading/unloading instruction is an unloading instruction, a target storage position corresponding to the goods to be unloaded from the autonomous vehicle can be determined, and the loading/unloading device can be controlled to unload the goods to be unloaded from the autonomous vehicle to the target storage position.

In an example, the loading instruction may include the goods ID number of the goods to be loaded, and the loading/unloading control device can determine the goods ID number of the goods to be loaded corresponding to the autonomous vehicle by: obtaining the goods ID number of the goods to be loaded corresponding to the autonomous vehicle from the loading instruction.

In an example, the loading instruction may include a vehicle ID number of the autonomous vehicle, and the correspondence between goods ID numbers of the goods to be loaded and vehicle ID numbers of the respective autonomous vehicles can be stored in advance in the loading/unloading control device. The loading/unloading control device can determine the goods ID number of the goods to be loaded corresponding to the autonomous vehicle by: determining from the correspondence the goods ID number of the goods to be loaded corresponding to the vehicle ID number of the autonomous vehicle in the loading instruction.

In some embodiments, the autonomous driving control device 3 and the vehicle scheduling system 2 can be connected by means of wireless communication. For example, they can communicate with each other using conventional wireless communication schemes such as Bluetooth, Local Area Network (LAN), infrared, Vehicle-to-Everything (V2X), or the like. Preferably, the autonomous driving control device 3 can be provided with a V2X device and the vehicle scheduling system 2 can be provided with a V2X device, such that the autonomous driving control device 3 and the vehicle scheduling system 2 can communicate with each other using the V2X communication technology.

In some embodiments, the loading/unloading control device 4 and the vehicle scheduling system 2 can be connected by means of wireless communication. For example, they can communicate with each other using conventional wireless communication schemes such as Bluetooth, LAN, infrared, V2X, or the like. Preferably, the vehicle scheduling system 2 can be provided with a V2X device and the loading/unloading control device 4 can be provided with a V2X device, such that the loading/unloading control device 4 and the vehicle scheduling system 2 can communicate with each other using the V2X communication technology.

In some embodiments, the autonomous driving control device 3 and the loading/unloading control device 4 can be connected by means of wireless communication. For example, they can communicate with each other using conventional wireless communication schemes such as Bluetooth, LAN, infrared, V2X, or the like. Preferably, the autonomous driving control device 3 can be provided with a V2X device and the loading/unloading control device 4 can be provided with a V2X device, such that the autonomous driving control device 3 and the loading/unloading control device 4 can communicate with each other using the V2X communication technology.

Embodiment 2

Figure 2:
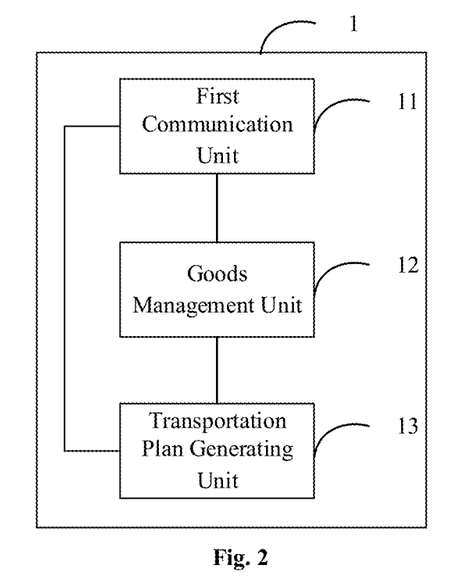
FIG. 2 is a schematic diagram showing a structure of a management system according to an embodiment of the present disclosure.

Based on the same principle as the system for automated loading/unloading according to the above Embodiment 1, Embodiment 2 of the present disclosure provides a management system 1 having a structure shown in FIG. 2, which includes a first communication unit 11, a goods management unit 12, and a transportation plan generating unit 13.

The first communication unit 11 is configured to transmit and receive information.

The goods management unit 12 is configured to manage goods information.

The transportation plan generating unit 13 is configured to generate a transportation plan based on the goods information, and transmit the transportation plan to a vehicle scheduling system via the first communication unit 11.

The goods information managed by the goods management unit 12 may include basic information of all goods contained in a particular area (e.g., a coastal port area, a highway port area, a logistics campus, a logistics center, a goods distribution center, a warehouse, a mining area, or the like), including for example: goods type, goods ID number, goods owner, goods source, goods storage time, current storage position of goods, goods transportation destination, deadline for delivery of goods to the transportation destination, etc. The transportation plan generating unit 13 can generate the transportation plan based on the goods information in the following, non-limiting scheme. For goods to be transported, shipping-from-storage time can be determined based on the deadline for delivery of the goods to be transported to the transportation destination, and the transportation plan containing transportation information can be generated for the goods to be transported. The transportation information may include, but not limited to, any one or more of the following information: goods type, goods ID number, goods shipping-from-storage time, goods transportation start point and goods transportation end point.

The goods transportation start point may be a storage position of the goods to be transported. Alternatively, the goods transportation start point may be a loading position corresponding to the storage position of the goods to be transported. For example, a port area may contain a large number of storage yards, each corresponding to one or more loading positions. A loading position for the storage yard where the storage position of the goods to be transported is located can be determined as the goods transportation start point. In another example, a logistics campus may contain a large number of warehouses, and an entrance position of each warehouse can be a loading position of the warehouse. The entrance position of the warehouse where the storage position of the goods to be transported is located can be determined as the goods transportation start point. The present disclosure is not limited to any of these examples. The goods transportation end point may be the transportation destination of the goods to be transported.

In some embodiments, in order to update the goods information in time such that the transportation plan generating unit 13 can generate the transportation plan accurately, the goods management unit 12 can be further configured to update, upon receiving a transportation task completion message via the first communication unit 11, the goods information based on the completed transportation task.

Embodiment 3

Figure 3:
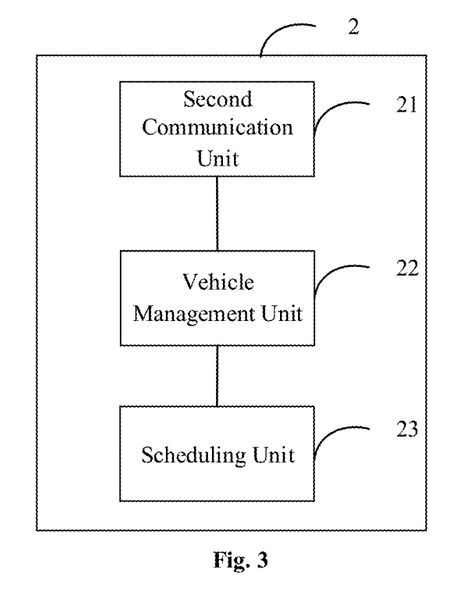
FIG. 3 is a schematic diagram showing a structure of a vehicle scheduling system according to an embodiment of the present disclosure.

Based on the same principle as the system for automated loading/unloading according to the above Embodiment 1, Embodiment 3 of the present disclosure provides a vehicle scheduling system 2 having a structure shown in FIG. 3, which includes a second communication unit 21, a vehicle management unit 22, and a scheduling unit 23.

The second communication unit 21 is configured to transmit and receive information.

The vehicle management unit 22 is configured to manage transportation statuses of respective autonomous vehicles.

The scheduling unit 23 is configured to generate, upon receiving a transportation plan via the second communication unit 21, transportation tasks based on the transportation plan and the transportation statuses of the respective autonomous vehicles, and transmit each of the transportation tasks to an autonomous driving control device for the matching autonomous vehicle via the second communication unit 21.

In some embodiments, the scheduling unit 23 can be further configured to transmit a transportation task completion message to a management system via the second communication unit 21 when determining that the autonomous vehicle has completed the corresponding transportation task.

In an embodiment of the present disclosure, the scheduling unit 23 can determine that the autonomous vehicle has completed the corresponding transportation task in the following, non-limiting scheme. When receiving the transportation task completion message from the autonomous driving control device via the second communication unit 21, the scheduling unit 23 can determine that the corresponding autonomous vehicle has completed the transportation task.

In an embodiment of the present disclosure, the identity information and vehicle type (for example, container truck, van, AGV, forklift, crane, etc.) of each autonomous vehicle may be stored in the scheduling unit 23 in advance. Each autonomous vehicle can periodically synchronize the transportation status of the autonomous vehicle (the transportation status may include position information and vehicle status information (including status information such as busy status or idle status) of the autonomous vehicle) to the vehicle management unit 22. Upon receiving the transportation plan, the scheduling unit 23 can generate the transportation tasks based on the transportation plan and the transportation statuses of the respective autonomous vehicles, and transmit each of the transportation tasks to the autonomous driving control device of the matching autonomous vehicle in the following, non-limiting scheme. For each transportation plan, a matching condition can be determined based on the transportation plan. From the managed autonomous vehicles, one autonomous vehicle that satisfies the matching condition can be selected as the autonomous vehicle matching the transportation plan. The transportation task can be generated based on the transportation plan and the matching autonomous vehicle. The transportation task may include, but not limited to, any one or more of the following information: goods type, goods ID number, goods shipping-from-storage time, goods transportation start point, goods transportation end point, and ID information of the matching autonomous vehicle. The matching condition may be, for example, the type of vehicle being capable of transporting the goods in the transportation plan, and the vehicle status of the autonomous vehicle being an idle status. The one autonomous vehicle that satisfies the matching condition can be selected from the managed autonomous vehicles as the autonomous vehicle matching the transportation plan as follows. A first set of autonomous vehicles each having a vehicle type capable of transporting the type of goods in the transportation plan is selected from the autonomous vehicles. A second set of autonomous vehicles each having a vehicle status of idle is selected from the first set of autonomous vehicles. If the second set of autonomous vehicles only contains one autonomous vehicle, the one autonomous vehicle can be directly determined as the autonomous vehicle matching the transportation plan. If the second set of autonomous vehicles contains more than one autonomous vehicle, an autonomous vehicle having its current position closest to the goods transportation start point in the transportation plan can be selected from the second set of autonomous vehicles, as the autonomous vehicle matching the transportation plan. If the second set of autonomous vehicles is null, an autonomous vehicle having its goods transportation end point closest to the goods transportation start point in the transportation plan can be selected from the first set of autonomous vehicles, as the autonomous vehicle matching the transportation plan.

In some embodiments, in order to update the transportation statuses of the respective autonomous vehicles stored in the vehicle management unit 22 in time such that the scheduling unit 23 can generate the transportation tasks to be distributed accurately, in an embodiment of the present disclosure, the vehicle management unit 22 can be further configured to update, upon receiving position information of the autonomous vehicle and/or transportation task completion information via the second communication unit 21, the transportation status of the corresponding autonomous vehicle based on the completed transportation task and/or the position information.

Embodiment 4

Figure 4:
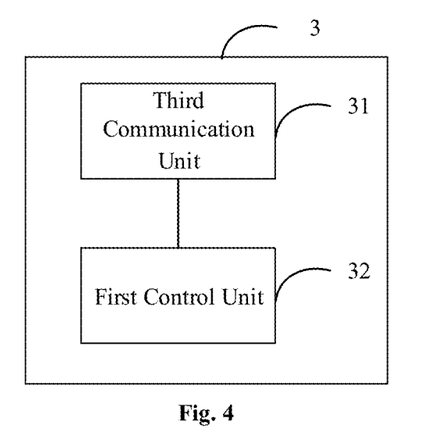
FIG. 4 is a schematic diagram showing a structure of an autonomous driving control device according to an embodiment of the present disclosure.

Based on the same principle as the system for automated loading/unloading according to the above Embodiment 1, Embodiment 4 of the present disclosure provides an autonomous driving control device 3 having a structure shown in FIG. 4, which includes a third communication unit 31 and a first control unit 32.

The third communication unit 31 is configured to transmit and receive information.

The first control unit 32 is configured to control, upon receiving a transportation task via the third communication unit 31, an autonomous vehicle to complete transportation in accordance with the transportation task.

In some embodiments, when the transportation task indicates moving to a goods transportation start point for loading goods, the transportation task may contain a loading position (which may be the goods transportation start point), and the first control unit 32 can control the autonomous vehicle to complete the transportation in accordance with the transportation task by: controlling the autonomous vehicle to move from a current position to the loading position; and upon determining that the loading is completed, controlling the autonomous vehicle to leave the loading position. When the transportation task indicates carrying goods to a goods transportation end point for unloading, the transportation task may contain an unloading position (which may be the above goods transportation end point), and the first control unit 32 can control the autonomous vehicle to complete the transportation in accordance with the transportation task by: controlling the autonomous vehicle to move from a current position to the unloading position; and upon determining that the unloading is completed, controlling the autonomous vehicle to leave the unloading position.

In some embodiments, when the transportation task indicates moving to a goods transportation start point for loading goods and carrying the goods to a goods transportation end point for unloading, the transportation task may contain a loading position (which may be the above goods transportation start point) and an unloading position (which may be the above goods transportation end point), and the first control unit 32 can control the autonomous vehicle to complete the transportation in accordance with the transportation task by: controlling the autonomous vehicle to move from a current position to the loading position; controlling, upon determining that the loading is completed, the autonomous vehicle to move from the loading position to the unloading position; and controlling, upon determining that the unloading is completed, the autonomous vehicle to leave the unloading position.

In an embodiment of the present disclosure, the first control unit 32 can control the autonomous vehicle to move from the current position to the loading position in the following, non-limiting scheme. The first control unit 32 can determine a first driving route from the current position as a start point to the loading position as an end point, and control the autonomous vehicle to move from the current position to the loading position along the first driving route. For further details, reference can be made to the related content in Embodiment 1, and description thereof will be omitted here.

In the embodiment of the present disclosure, the first control unit 32 can control the autonomous vehicle to move from the loading position to the unloading position in the following, non-limiting scheme. The first control unit 32 can determine a second driving route from the loading position as a start point to the unloading position as an end point, and control the autonomous vehicle to move from the loading position to the unloading position along the second driving route. For further details, reference can be made to the related content in Embodiment 1, and description thereof will be omitted here.

In some embodiments, the first control unit 32 can determine that the loading is completed when:

an instruction indicating completion of the loading onto the autonomous vehicle is received from the loading/unloading control device via the third communication unit 31 (for further details, reference can be made to Scheme B1 in Embodiment 1, and description thereof will be omitted here), an instruction indicating completion of the loading onto the autonomous vehicle is received from the vehicle scheduling system via the third communication unit 31 (for further details, reference can be made to Scheme B2 in Embodiment 1, and description thereof will be omitted here), it is determined that a gravity value outputted from a gravity sensor mounted on the autonomous vehicle is greater than or equal to a predetermined gravity threshold and the gravity value has not changed for a predetermined time period (for further details, reference can be made to Scheme B3 in Embodiment 1, and description thereof will be omitted here), a notification message indicating completion of the loading onto the autonomous vehicle is obtained by identifying, using a predetermined image identification algorithm, content in an image of an electronic screen located near the loading position as captured by a vehicle mounted camera provided on the autonomous vehicle (for further details, reference can be made to Scheme B4 in Embodiment 1, and description thereof will be omitted here), or a notification message indicating completion of the loading onto the autonomous vehicle as broadcasted by a voice broadcaster is identified using a predetermined voice model (for further details, reference can be made to Scheme B5 in Embodiment 1, and description thereof will be omitted here).

In some embodiments the first control unit 32 determine that the unloading is completed when:

an instruction indicating completion of the unloading from the autonomous vehicle is received from the loading/unloading control device via the third communication unit 31 (for further details, reference can be made to Scheme C1 in Embodiment 1, and description thereof will be omitted here), an instruction indicating completion of the unloading from the autonomous vehicle is received from the vehicle scheduling system via the third communication unit 31 (for further details, reference can be made to Scheme C2 in Embodiment 1, and description thereof will be omitted here), it is determined that a gravity value outputted from a gravity sensor mounted on the autonomous vehicle is smaller than or equal to a predetermined gravity threshold and the gravity value has not changed for a predetermined time period (for further details, reference can be made to Scheme C3 in Embodiment 1, and description thereof will be omitted here), a notification message indicating completion of the unloading from the autonomous vehicle is obtained by identifying, using a predetermined image identification algorithm, content in an image of an electronic screen located near the unloading position as captured by a vehicle mounted camera provided on the autonomous vehicle (for further details, reference can be made to Scheme C4 in Embodiment 1, and description thereof will be omitted here), or a notification message indicating completion of the unloading from the autonomous vehicle as broadcasted by a voice broadcaster is identified using a predetermined voice model (for further details, reference can be made to Scheme C5 in Embodiment 1, and description thereof will be omitted here).

In an embodiment of the present disclosure, the first control unit 32 can be further configured to transmit a transportation task completion message to a vehicle management system when determining that the transportation task is completed.

Embodiment 5

Figure 5:
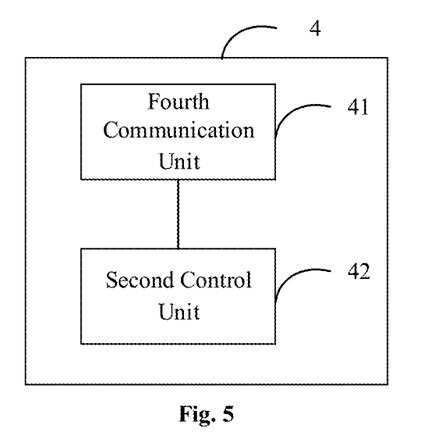
FIG. 5 is a schematic diagram showing a structure of a loading/unloading control device according to an embodiment of the present disclosure.

Based on the same principle as the system for automated loading/unloading according to the above Embodiment 1, Embodiment 5 of the present disclosure provides a loading/unloading control device 4 having a structure shown in FIG. 5, which includes a fourth communication unit 41 and a second control unit 42.

The fourth communication unit 41 is configured to transmit and receive information.

The second control unit 42 is configured to control a loading/unloading device to automatically load goods onto or unload goods from an autonomous vehicle.

In some embodiments each loading/unloading device may correspond to at least one loading/unloading position. The second control unit 42 can control the loading/unloading device to automatically load goods onto or unload goods from the autonomous vehicle by:

receiving a loading/unloading instruction from the autonomous driving control device of the autonomous vehicle stopping at the loading/unloading position corresponding to the loading/unloading device via the fourth communication unit 41, and controlling the loading/unloading device to load goods onto or unload goods from the autonomous vehicle in accordance with the loading/unloading instruction (for further details, reference can be made to Scheme D1 in Embodiment 1, and description thereof will be omitted here), receiving from the vehicle scheduling system a loading/unloading instruction to load goods onto or unload goods from the autonomous vehicle stopping at the loading/unloading position corresponding to the loading/unloading device via the fourth communication unit 41, and controlling the loading/unloading device to load goods onto or unload goods from the autonomous vehicle in accordance with the loading/unloading instruction (for further details, reference can be made to Scheme D2 in Embodiment 1, and description thereof will be omitted here), or obtaining a vehicle identification (ID) number of the autonomous vehicle stopping at the loading/unloading position corresponding to the loading/unloading device, determine a loading/unloading instruction corresponding to the autonomous vehicle from a predetermined correspondence between vehicle ID numbers and loading/unloading instructions, and controlling the loading/unloading device to load goods onto or unload goods from the autonomous vehicle in accordance with the loading/unloading instruction (for further details, reference can be made to Scheme D3 in Embodiment 1, and description thereof will be omitted here).

In some embodiments, the second control unit 42 can control the loading/unloading device to load goods onto or unload goods from the autonomous vehicle in accordance with the loading/unloading instruction by:

determining, when the loading/unloading instruction is a loading instruction, a goods ID number and a storage position of the goods to be loaded corresponding to the autonomous vehicle, and control the loading/unloading device to obtain the goods to be loaded corresponding to the goods ID number from the storage position and to load the goods to be loaded onto the autonomous vehicle, or determining, when the loading/unloading instruction is an unloading instruction, a target storage position corresponding to the goods to be unloaded from the autonomous vehicle, and control the loading/unloading device to unload the goods to be unloaded from the autonomous vehicle to the target storage position.

In an example, the loading instruction may include the goods ID number of the goods to be loaded, and the second control unit 42 can determine the goods ID number of the goods to be loaded corresponding to the autonomous vehicle by: obtaining the goods ID number of the goods to be loaded corresponding to the autonomous vehicle from the loading instruction.

In an example, the loading instruction may include a vehicle ID number of the autonomous vehicle, and the correspondence between goods ID numbers of the goods to be loaded and vehicle ID numbers of the respective autonomous vehicles can be stored in advance in the loading/unloading control device. The second control unit 42 can determine the goods ID number of the goods to be loaded corresponding to the autonomous vehicle by: determining from the correspondence the goods ID number of the goods to be loaded corresponding to the vehicle ID number of the autonomous vehicle in the loading instruction.

In some embodiments, the second control unit 42 can obtain the vehicle ID number of the autonomous vehicle stopping at the loading/unloading position corresponding to the loading/unloading device by:

capturing a picture on the autonomous vehicle using a camera provided on the loading/unloading device, and identifying the vehicle ID number from the picture using an image identification technology, the picture containing the vehicle ID number of the autonomous vehicle (for further details, reference can be made to the related content in Embodiment 1, and description thereof will be omitted here), or reading an electronic tag provided on the autonomous vehicle using an inductive reader provided on the loading/unloading device to obtain the vehicle ID number of the autonomous vehicle, the electronic tag containing the vehicle ID number of the autonomous vehicle (for further details, reference can be made to the related content in Embodiment 1, and description thereof will be omitted here).

The basic principles of the present disclosure have been described above with reference to the embodiments. However, it can be appreciated by those skilled in the art that all or any of the steps or components of the method or device according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A system for automated goods transportation, comprising a management system, a vehicle scheduling system, a loading/unloading control device, and autonomous driving control devices provided on respective autonomous vehicles, wherein the management system is configured to manage goods information, generate a transportation plan based on the goods information, and transmit the transportation plan to the vehicle scheduling system;

wherein the vehicle scheduling system is configured to generate, upon receiving the transportation plan, transportation tasks based on the transportation plan and transportation statuses of the respective autonomous vehicles, and transmit each of the transportation tasks to the autonomous driving control device of a matching one of the autonomous vehicles;

wherein the autonomous driving control device on each of the autonomous vehicles is configured to control, upon receiving the transportation task, the autonomous vehicle to complete transportation in accordance with the transportation task;

wherein the transportation task indicates a loading position and an in-area driving route from an entrance of a particular area to the loading position;

wherein the autonomous driving control device is configured to control the autonomous vehicle to complete the transportation in accordance with the transportation task by:

planning an out-of-area driving route from a current position to the entrance of the particular area as a navigation route;

controlling the autonomous vehicle to move from the current position to the entrance of the particular area in accordance with the navigation route;

in response to arriving at the entrance of the particular area, switching the navigation route from the planned out-of-area driving route to the received in-area driving route; and controlling the autonomous vehicle to move from the entrance of the particular area to the loading position in accordance with the switched navigation route;

wherein the loading/unloading control device is configured to control a loading/unloading device to automatically load goods onto or unload goods from the autonomous vehicles;

wherein the transportation task further contains an unloading position, and the autonomous driving control device being configured to control the autonomous vehicle to complete the transportation in accordance with the transportation task comprises the autonomous driving control device being configured to:

control, upon determining that loading/unloading is completed, the autonomous vehicle to leave the loading position or the unloading position; and wherein the autonomous driving control device determines that the loading is completed when:

it is determined that a gravity value outputted from a gravity sensor mounted on the autonomous vehicle is greater than or equal to a predetermined gravity threshold and the gravity value has not changed for a predetermined time period, a notification message indicating completion of the loading onto the autonomous vehicle is obtained by identifying, using a predetermined image identification algorithm, content in an image of an electronic screen located near the loading position as captured by a vehicle mounted camera provided on the autonomous vehicle, or a notification message indicating completion of the loading onto the autonomous vehicle as broadcasted by a voice broadcaster is identified using a predetermined voice model.

2. The system of claim 1, wherein the autonomous driving control device being configured to control the autonomous vehicle to complete the transportation in accordance with the transportation task comprises the autonomous driving control device being configured to:

control, upon determining that loading is completed, the autonomous vehicle to move from the loading position to the unloading position; and control, upon determining that unloading is completed, the autonomous vehicle to leave the unloading position.

3. The system of claim 1, wherein the autonomous driving control device determines that the unloading is completed when:

a first instruction indicating completion of the unloading from the autonomous vehicle is received from the loading/unloading control device, a second instruction indicating completion of the unloading from the autonomous vehicle is received from the vehicle scheduling system, it is determined that a gravity value outputted from a gravity sensor mounted on the autonomous vehicle is smaller than or equal to a predetermined gravity threshold and the gravity value has not changed for a predetermined time period, a notification message indicating completion of the unloading from the autonomous vehicle is obtained by identifying, using a predetermined image identification algorithm, content in an image of an electronic screen located near the unloading position as captured by a vehicle mounted camera provided on the autonomous vehicle, or a notification message indicating completion of the unloading from the autonomous vehicle as broadcasted by a voice broadcaster is identified using a predetermined voice model.

4. The system of claim 1, wherein each loading/unloading device corresponds to at least one loading/unloading position, and the loading/unloading control device being configured to control the loading/unloading device to automatically load goods onto or unload goods from the autonomous vehicle comprises the loading/unloading control device being configured to:

receive a loading/unloading instruction from the autonomous driving control device of the autonomous vehicle stopping at the loading/unloading position corresponding to the loading/unloading device, and control the loading/unloading device to load goods onto or unload goods from the autonomous vehicle in accordance with the loading/unloading instruction, receive from the vehicle scheduling system a loading/unloading instruction to load goods onto or unload goods from the autonomous vehicle stopping at the loading/unloading position corresponding to the loading/unloading device, and control the loading/unloading device to load goods onto or unload goods from the autonomous vehicle in accordance with the loading/unloading instruction, or obtain a vehicle identification (ID) number of the autonomous vehicle stopping at the loading/unloading position corresponding to the loading/unloading device, determine a loading/unloading instruction corresponding to the autonomous vehicle from a predetermined correspondence between vehicle ID numbers and loading/unloading instructions, and control the loading/unloading device to load goods onto or unload goods from the autonomous vehicle in accordance with the loading/unloading instruction.

5. The system of claim 4, wherein the loading/unloading control device being configured to control the loading/unloading device to load goods onto or unload goods from the autonomous vehicle in accordance with the loading/unloading instruction comprises the loading/unloading control device being configured to:

determine, when the loading/unloading instruction is a loading instruction, a goods ID number and a storage position of the goods to be loaded corresponding to the autonomous vehicle, and control the loading/unloading device to obtain the goods to be loaded corresponding to the goods ID number from the storage position and to load the goods to be loaded onto the autonomous vehicle, or determine, when the loading/unloading instruction is an unloading instruction, a target storage position corresponding to the goods to be unloaded from the autonomous vehicle, and control the loading/unloading device to unload the goods to be unloaded from the autonomous vehicle to the target storage position.

6. The system of claim 4, wherein the loading/unloading control device being configured to obtain the vehicle ID number of the autonomous vehicle stopping at the loading/unloading position corresponding to the loading/unloading device comprises the loading/unloading control device being configured to:

capture a picture on the autonomous vehicle using a camera provided on the loading/unloading device, and identifying the vehicle ID number from the picture using an image identification technology, the picture containing the vehicle ID number of the autonomous vehicle, or read an electronic tag provided on the autonomous vehicle using an inductive reader provided on the loading/unloading device to obtain the vehicle ID number of the autonomous vehicle, the electronic tag containing the vehicle ID number of the autonomous vehicle.

7. The system of claim 1, wherein the vehicle scheduling system being configured to generate the transportation tasks based on the transportation plan and the transportation statuses of the respective autonomous vehicles comprises the vehicle scheduling system being configured to, for each transportation plan:
- determine a matching condition based on the transportation plan;
- select, from the autonomous vehicles under management, one autonomous vehicle that satisfies the matching condition as the matching autonomous vehicle for the transportation plan; and
- generate the transportation task based on the transportation plan and the matching autonomous vehicle.

8. The system of claim 1, wherein each loading/unloading device corresponds to at least one loading/unloading position, and the loading/unloading control device being configured to control the loading/unloading device to automatically load goods onto or unload goods from the autonomous vehicle comprises the loading/unloading control device being configured to:
- obtain a vehicle identification (ID) number of the autonomous vehicle stopping at the loading/unloading position corresponding to the loading/unloading device, determine a loading/unloading instruction corresponding to the autonomous vehicle from a predetermined correspondence between vehicle ID numbers and loading/unloading instructions, and control the loading/unloading device to load goods onto or unload goods from the autonomous vehicle in accordance with the loading/unloading instruction.

9. The system of claim 8, wherein the loading/unloading control device being configured to control the loading/unloading device to load goods onto or unload goods from the autonomous vehicle in accordance with the loading/unloading instruction comprises the loading/unloading control device being configured to:
- determine, when the loading/unloading instruction is a loading instruction, a goods ID number and a storage position of the goods to be loaded corresponding to the autonomous vehicle, and control the loading/unloading device to obtain the goods to be loaded corresponding to the goods ID number from the storage position and to load the goods to be loaded onto the autonomous vehicle.

10. An autonomous driving control device, comprising:
- a third communication unit configured to transmit and receive information; and
- a first control unit configured to control, upon receiving a transportation task via the third communication unit, an autonomous vehicle to complete transportation in accordance with the transportation task,
- wherein the transportation task indicates a loading position and an in-area driving route from an entrance of a particular area to the loading position;
- wherein the first control unit is configured to control the autonomous vehicle to complete the transportation in accordance with the transportation task by:
  - planning an out-of-area driving route from a current position to the entrance of the particular area as a navigation route;
  - controlling the autonomous vehicle to move from the current position to the entrance of the particular area in accordance with the navigation route;
  - in response to arriving at the entrance of the particular area, switching the navigation route from the planned out-of-area driving route to the received in-area driving route; and
  - controlling the autonomous vehicle to move from the entrance of the particular area to the loading position in accordance with the switched navigation route;
- wherein the transportation task further contains an unloading position, and the first control unit being configured to control the autonomous vehicle to complete the transportation in accordance with the transportation task comprises the first control unit being configured to:
- control, upon determining that loading/unloading is completed, the autonomous vehicle to leave the loading position or the unloading position; and
- wherein the first control unit determines that the loading is completed when:
  - it is determined that a gravity value outputted from a gravity sensor mounted on the autonomous vehicle is greater than or equal to a predetermined gravity threshold and the gravity value has not changed for a predetermined time period,
  - a notification message indicating completion of the loading onto the autonomous vehicle is obtained by identifying, using a predetermined image identification algorithm, content in an image of an electronic screen located near the loading position as captured by a vehicle mounted camera provided on the autonomous vehicle, or
  - a notification message indicating completion of the loading onto the autonomous vehicle as broadcasted by a voice broadcaster is identified using a predetermined voice model.

11. The device of claim 10, wherein the first control unit being configured to control the autonomous vehicle to complete the transportation in accordance with the transportation task comprises the first control unit being configured to:
- control, upon determining that loading is completed, the autonomous vehicle to move from the loading position to the unloading position; and
- control, upon determining that unloading is completed, the autonomous vehicle to leave the unloading position.

12. The device of claim 10, wherein the first control unit determines that the unloading is completed when:
- a first indicating completion of the unloading from the autonomous vehicle is received from a loading/unloading control device via the third communication unit,
- a second indicating completion of the unloading from the autonomous vehicle is received from a vehicle scheduling system via the third communication unit,
- it is determined that a gravity value outputted from a gravity sensor mounted on the autonomous vehicle is smaller than or equal to a predetermined gravity threshold and the gravity value has not changed for a predetermined time period,
- a notification message indicating completion of the unloading from the autonomous vehicle is obtained by identifying, using a predetermined image identification algorithm, content in an image of an electronic screen located near the unloading position as captured by a vehicle mounted camera provided on the autonomous vehicle, or
- a notification message indicating completion of the unloading from the autonomous vehicle as broadcasted by a voice broadcaster is identified using a predetermined voice model.

13. An autonomous vehicle, comprising the autonomous driving control device of claim 10.

\* \* \* \* \*